US009705431B2

(12) United States Patent
Reiter

(10) Patent No.: US 9,705,431 B2
(45) Date of Patent: Jul. 11, 2017

(54) DEVICE AND METHOD FOR INDUCING FERMION MASS MODIFICATIONS IN METALLOIDS

(71) Applicant: Debora A. Reiter, Gibsonburg, OH (US)

(72) Inventor: Nicholas Alan Reiter, Gibsonburg, OH (US)

( * ) Notice: Subject to any disclaimer, the term of this patent is extended or adjusted under 35 U.S.C. 154(b) by 139 days.

(21) Appl. No.: 14/275,841

(22) Filed: May 12, 2014

(65) Prior Publication Data

US 2014/0333155 A1     Nov. 13, 2014

Related U.S. Application Data

(60) Provisional application No. 61/822,350, filed on May 11, 2013.

(51) Int. Cl.
| | | |
|---|---|---|
| *H02N 2/00* | (2006.01) | |
| *H02N 10/00* | (2006.01) | |
| *H02N 11/00* | (2006.01) | |

(52) U.S. Cl.
CPC .................................. *H02N 11/00* (2013.01)

(58) Field of Classification Search
CPC .................................. H01L 41/08; C25B 9/00
USPC .......... 310/309, 311, 323.02, 323.06, 323.11
See application file for complete search history.

(56) References Cited

U.S. PATENT DOCUMENTS

| | | | | |
|---|---|---|---|---|
| 5,218,251 A | * | 6/1993 | Allwine, Jr. | ............. G01B 7/30 |
| | | | | 310/156.36 |
| 2005/0093393 A1 | * | 5/2005 | Hirzel | ...................... H02K 3/12 |
| | | | | 310/268 |
| 2008/0035492 A1 | * | 2/2008 | Hilliard | ......................... 205/688 |
| 2008/0257718 A1 | * | 10/2008 | Chiang et al. | ................. 204/242 |

FOREIGN PATENT DOCUMENTS

JP           59110362 A   *   6/1984

\* cited by examiner

*Primary Examiner* — Jose Gonzalez Quinones
(74) *Attorney, Agent, or Firm* — MacMillan, Sobanski & Todd, LLC

(57) ABSTRACT

A useful technique for the temporary modification of Fermion mass at room temperature in certain metalloids is disclosed. This technique has demonstrated an easily observable weight modification effect, using novel but comparatively inexpensive materials, in an industrial or everyday environment, at room temperature. Various simple and easily engineered methods for converting this modification into a useful source of propulsive directed force are disclosed.

8 Claims, 5 Drawing Sheets

DEVICE AND METHOD FOR INDUCING FERMION MASS MODIFICATIONS IN METALLOIDS

CROSS-REFERENCE TO RELATED APPLICATIONS

This application claims the benefit of U.S. Provisional Application No. 61/822,350, filed May 11, 2013, the disclosure of which is incorporated herein by reference.

BACKGROUND OF THE INVENTION

This invention relates in general to devices having electrical inputs and mechanical outputs.

Satellites and other space craft operating in low gravity environments require precise and efficient techniques for orbital and navigational adjustment. Continuous propulsive thrust in low gravity environments for these same spacecraft and satellites is also fuel intensive and problematic.

Low thrust linear propulsion as well as micro-propulsion for system navigation, in a low gravity environment, have heretofore relied on classical Newtonian reactive techniques. Among these are rockets, electrically accelerated ion thrust, or gas jets. For high thrust or impulse deep space propulsion, exotic techniques have been proposed, involving nuclear detonations, particle beams, space-time distortion, or manipulation of the quantum vacuum. In low thrust applications, the current techniques and embodiments require several key elements that contribute to levels of cost and reliability:

1. Non-recoverable fuel and oxidizers, even in the case of ion propulsion.
2. Moving parts, in the form of valves, servomotor positioning, or linear actuators.
3. Potentially explosive materials and configurations of materials.

SUMMARY OF THE INVENTION

This invention relates to in general to devices having electrical inputs and mechanical outputs.

This invention has demonstrated an easily observable weight modification effect, using novel but comparatively inexpensive materials, in an industrial or every-day environment, at room temperature. By application of engineering practices and embodiments, this weight modification may be used to address the aforementioned problems. In particular, for low thrust applications, the several embodiments described herein would be capable of overcoming certain limiting factors of existing technology, since they:

1. Use no non-recoverable fuel, and only a modest level of electrical power.
2. Can be configured to provide thrust with no moving parts or components.
3. Use only solid state materials that are not volatile or difficult to utilize.

Modification of Fermion mass is a relatively new field of physical material properties. It has previously been observed only in difficult to achieve laboratory settings, using complex alloys of Lanthanide series elements and metals. This property has heretofore been observed only at or near cryogenic temperatures in certain Rare Earth alloys, and was not observed to yield mass transient values of a useful nature.

This invention consists of a novel effect evident in a specific family of crystalline or polycrystalline materials, observable at room temperature, when an electrical current is passed through them. It has been demonstrated that in this family of materials, a small but useful increase in the apparent weight of the conductive unit manifests.

It has been observed and demonstrated that conductive elements or members consisting of materials including but not limited to: Bi, $Bi_2Te_3$, $Bi_2Se_3$, Te, HgTe, as well as doped versions of these compounds, exhibit the desired and claimed property to a small or larger degree. Best results to date have been observed with n-doped (Se) $Bi_2Te_3$.

The basis for this property and useful effect lies in a novel property of conduction band electrons (fermions). When fermions pass through the lattice of certain materials under the influence of an electrical field, energy from lattice phonons appears to be adsorbed, with the result being a temporary modification of the particle mass. Upon exiting the lattice of the material in use, this energy is given back up into the non-active conductor, and the mass (and apparent weight) of the fermion returns to normal. It is believed that the basis for the unique property observed must lie in a quantum mechanical process in which mass is temporarily modified over a very short distance and time in an exchange modality.

As one application, the embodiments disclosed herein can preferably be used in cases where reliable low magnitude thrust is required for either propulsion or navigation in low gravity. Alternatively, it is also feasible that with sufficient engineering, deep space propulsion might be aided as well.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
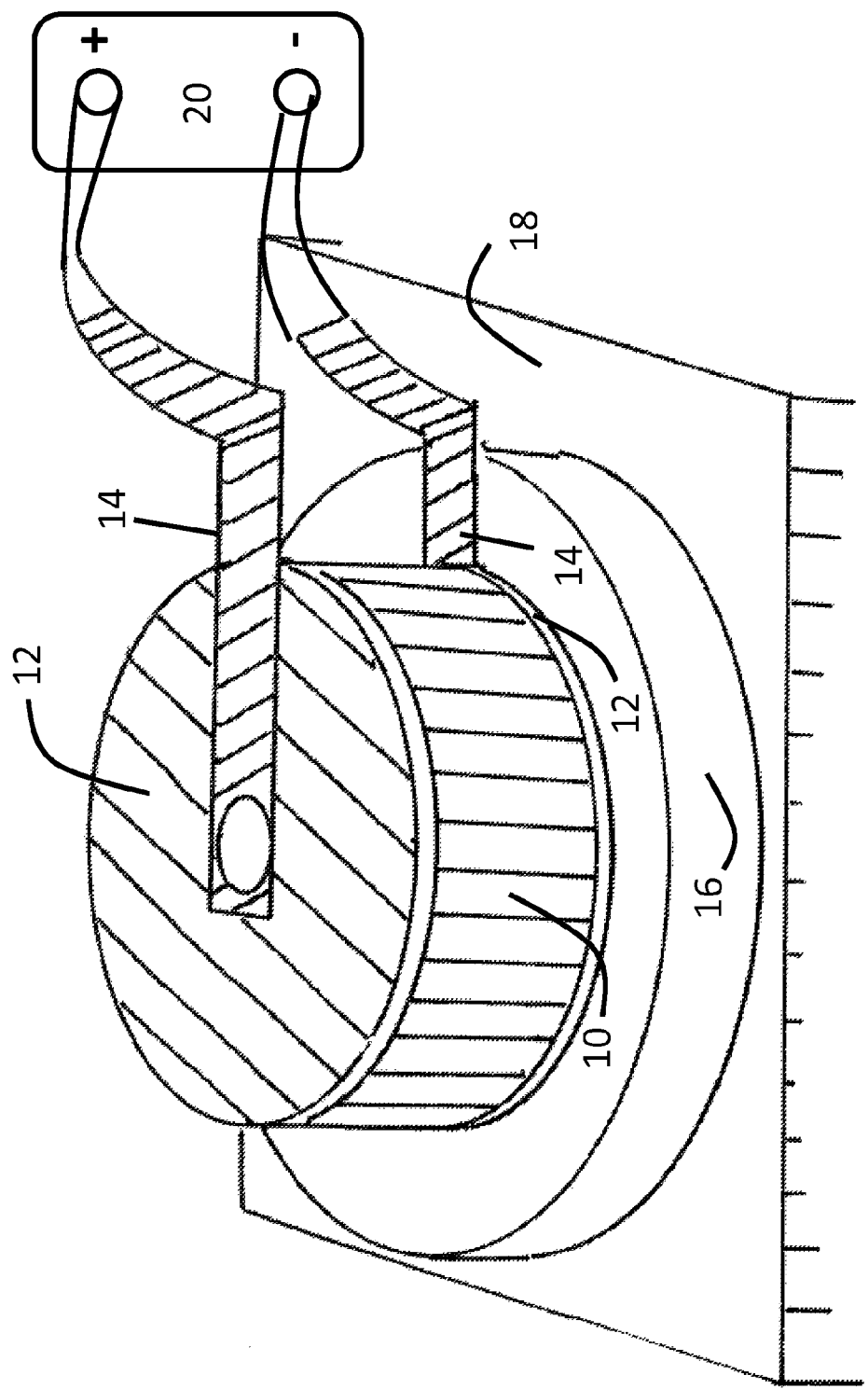
FIG. 1 depicts an embodiment of a physically responsive and mass increasing device having an electrical input and embodying the principles of the invention.

Referring now to the drawings, there is illustrated in FIG. 1 an embodiment of a physically responsive and mass increasing device having an electrical input. As stated above, satellites and other spacecraft operating in low gravity environments require precise, efficient techniques for orbital and navigational adjustment. Continuous propulsive thrust in low gravity environments for these same spacecraft and satellites is also fuel intensive and problematic. The disclosed invention helps solves these problems.

In particular, the disclosed invention demonstrates a technique for temporarily modifying the weight and inertial properties of components made of specific elements or compounds, without cryogenic conditions. When utilized in the disclosed embodiments, these modifications can be used for milli-Newton level or greater propulsive force, in an energy efficient and highly controllable fashion. Such embodiments would be well suited for spacecraft orbital positioning, navigational adjustment, or low level long term propulsion in low gravity environments.

Fermionic mass modification has been observed in complex alloys exhibiting a Kondo Lattice nature at cryogenic temperatures (near 0 degrees K). The disclosed embodiments utilize a different family of materials capable of exhibiting a similar or more robust effect, at room temperature. The family of materials disclosed are readily available, and provide greater opportunity for engineering embodiments. Previous work in this field has not been capable of yielding engineer-able results and practical applications, due to cost of materials and cryogenic environment. This invention has demonstrated an easily observable weight modification effect, using novel but comparatively inexpensive materials, in an industrial or every-day environment, at room temperature.

In one embodiment, an electrically contacted element, consisting of a thin film coating, wafer, or poly- or single crystalline slice of one of the specified metalloid materials is provided. The electrically contacted element will consist of one of the following materials: elemental Bismuth (preferably of greater than 99.99% purity), elemental Tellurium (preferably of greater than 99.99% purity), Bismuth Telluride, Bismuth Selenide, Bismuth Antimonide, Mercury Telluride, or Bismuth Mercury Telluride. These materials may be used in an intrinsic high purity form, or may be doped to provide n- and p-electronic properties. Suitable dopant materials may include but not be limited to Se, Sb, As, Te, Pb or P. To effect the mass increase, an electrical current (either direct or alternating) is applied to the contacted element, either continuously or in discrete timed pulses.

One application embodies a mechanically rotating system in which multiple units of the contacted element described in are located, such that the electrical current may be applied in properly timed fashion. Another application embodies a mechanically reciprocating system in which one or more units of the contacted element are located, such that the electrical current may be applied in properly timed fashion. When electrical current is applied to the contacted element, a measurable and potentially useful increase in the weight of the contacted element is observed. It is hypothesized that this macroscopic weight increase is due to the temporary alteration of mass of conduction band electrons (Fermions) as they propagate through the material lattice of the contacted element. Upon cessation of electrical current, the previously registered weight increase is seen to dissipate. In experimental replications to date, for contacted elements of a starting weight of between 1 and 10 grams, and applied electrical currents of between 3 and 10 amperes, weight increase values of between 1 and 10 milligrams have been observed. It has been observed that the magnitude of the temporary weight increase is proportional to current density or charge carrier density within the contacted element. Practical use of this property could be embodied in either a rotating or reciprocating mechanical system in which contacted elements are contained. By timing the application of electrical current, and thus weight increase period, an anisotropic or unbalanced directed mechanical moment could be obtained.

The electrically contacted component described previously may be made by either coating of the desired material via physical vapor deposition or sputtering, onto a suitable conductive substrate, or by the slicing and machining of a pre-fabricated crystal or boule. For either technique, electrical contact may be made physically by means of foil bonding, soldering, conductive adhesive, or mechanical compression of a suitable set of tabs or bus bars. Mounting of these elements in a practical rotating or reciprocating system would be by conventional best practice.

Electrical current and switching—control thereof may be provided by conventional and commercial circuitry and power sources. Fabrication of the contacted element from the materials specified is essential. Control elements fabricated from other electrically conductive materials, such as copper, aluminum, tin, steel, carbon, and brass showed no indication of the useful effect described herein.

Methods of electrical contacting, as well as DC or AC electrical supply and control, may be varied as required by the application. Design of rotating or reciprocating mechanical systems to utilize the temporary weight alteration of the contacted element may also be varied. The timing of applied electrical current to effectively direct or cohere a mechanical moment is suitably controlled.

The various mechanical systems disclosed as part of the scope of the invention could be installed either singly or in synchronized arrays of multiple units, on satellites or spacecraft operating in low gravity environments. Units could be mounted to provide useful force vectors in all axes of possible motion.

The described embodiments may advantageously have applicability and usefulness in very light load mechanical transport in a laboratory setting, or where a delicate or hazardous manufactured item need to be transported with precision in an industrial setting via a driven product carrier.

FIG. 1 depicts a basic embodiment of the above-described principle. A simple active element consisting of a polycrystalline mass 10 of one of the aforementioned family of compounds is electrically contacted via low resistance ohmic contacts that may consist of solder, silver foil or adhesive, or compressed foil tabs 12 of suitable conductivity. Electrical current of sufficient magnitude is supplied via magnetically compensated, mechanically strain-relieved strips, wires, or cables 14 connected to an electric power source 20. For demonstration purposes, the unit as depicted is placed upon an electrically insulating cradle or mass 16 that in turn rests on the pan of a sufficiently accurate balance 18. When electrical current is switched on by external means, it may be observed that the system under test will gain a discrete amount of weight, generally doing so within a time period of several seconds.

Figure 2:
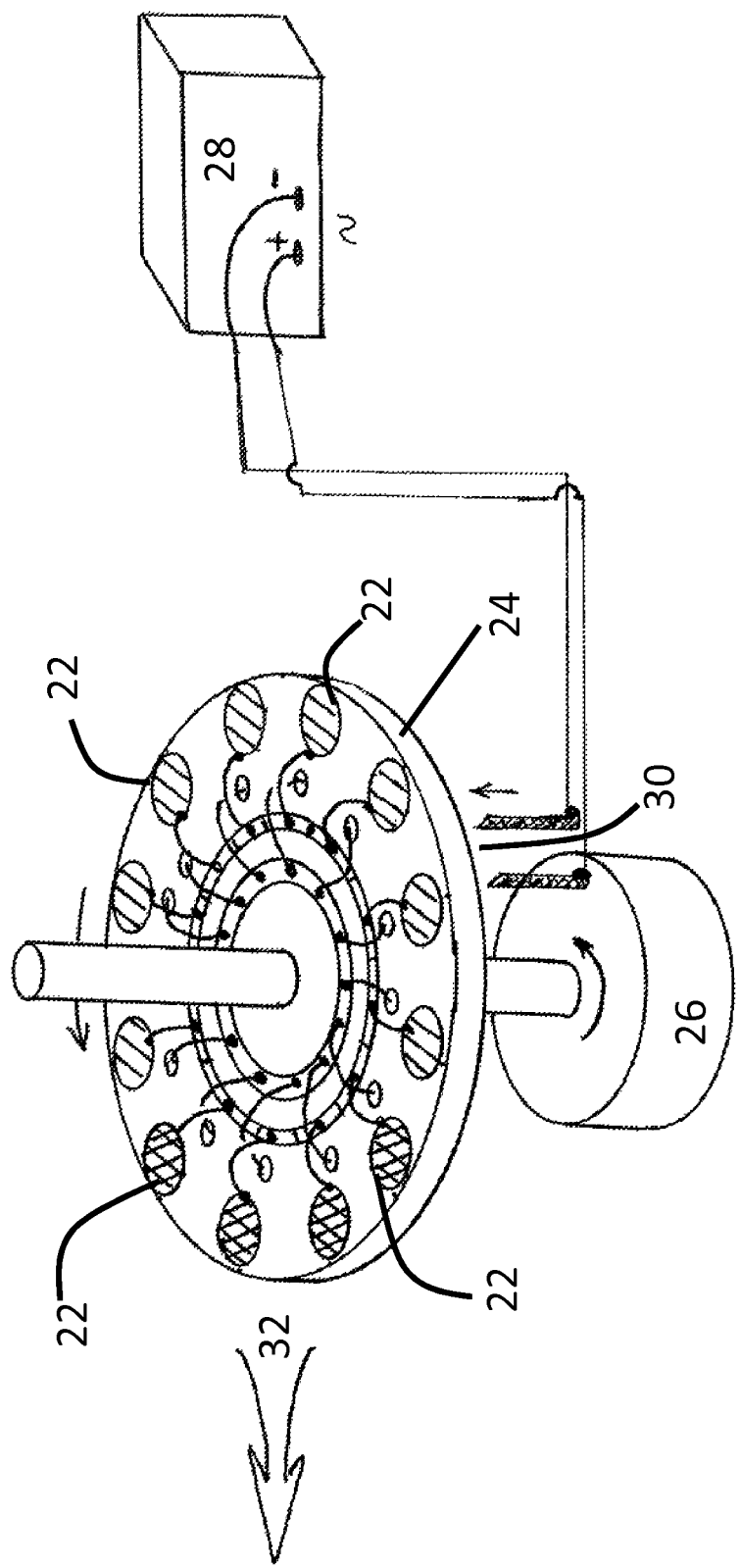
FIG. 2 depicts an embodiment of a mechanical machine including one or more of devices of FIG. 1 that is capable of producing a useful linear propulsive force.

FIG. 2 depicts one mechanical engineered embodiment capable of producing a useful linear propulsive force. A set of equidistantly spaced active elements 22 are located around the rim of a disc or annular shaped rotating assembly 24 that is driven by a motor or other suitable mechanical means 26. As the active elements 22 are rotated through 360 degrees at a pre-determined angular speed, electrical current is applied from a power supply 28 and a timed switch 30 of either mechanical or electronic disposition. The timing of said applied electrical current is set to coincide with one or more of the active weight gaining elements 22 rotating past a desired position relative to the outside environment. In this fashion, the aggregate weight of the entire assembly will be found to be greater in the direction of 32 than otherwise, resulting in a continuous rectified force capable of impelling the entire apparatus.

Figure 3:
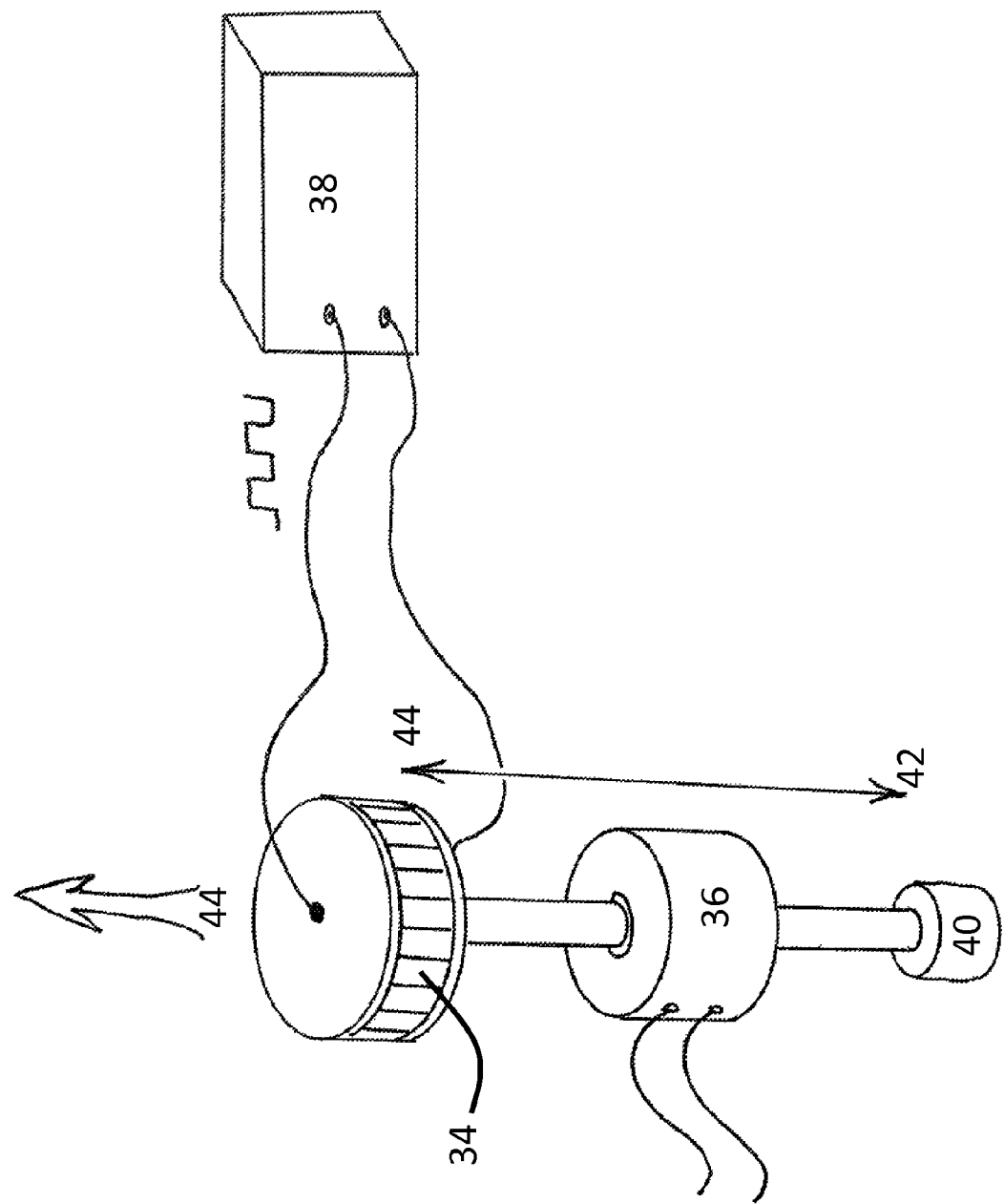
FIG. 3 depicts another embodiment of a mechanical machine including one or more of devices of FIG. 1.

FIG. 3 depicts a second mechanical engineered embodiment capable of producing a useful linear propulsive force. One or more active weight gaining elements 34 are mounted on a long period reciprocating piston or solenoid driven mechanical actuator 36. Electrical current pulses, appropriately timed, are applied to the active element 34. Since preferred applications are directed toward a low gravity environment, a counter-mass 40 is affixed to the mechanical reciprocating member 36 for mechanical balancing at a rest mass condition. The timing of applied electrical pulses 38 is such that the active element 34 will be in a state of enhanced mass, at the outer extremity of the mechanical actuation 42 and at rest or minimal mass at a timing of 180 degrees from 42. In this fashion, a rectified force is felt by the entirety of the system in the direction shown as 44.

Figure 4:
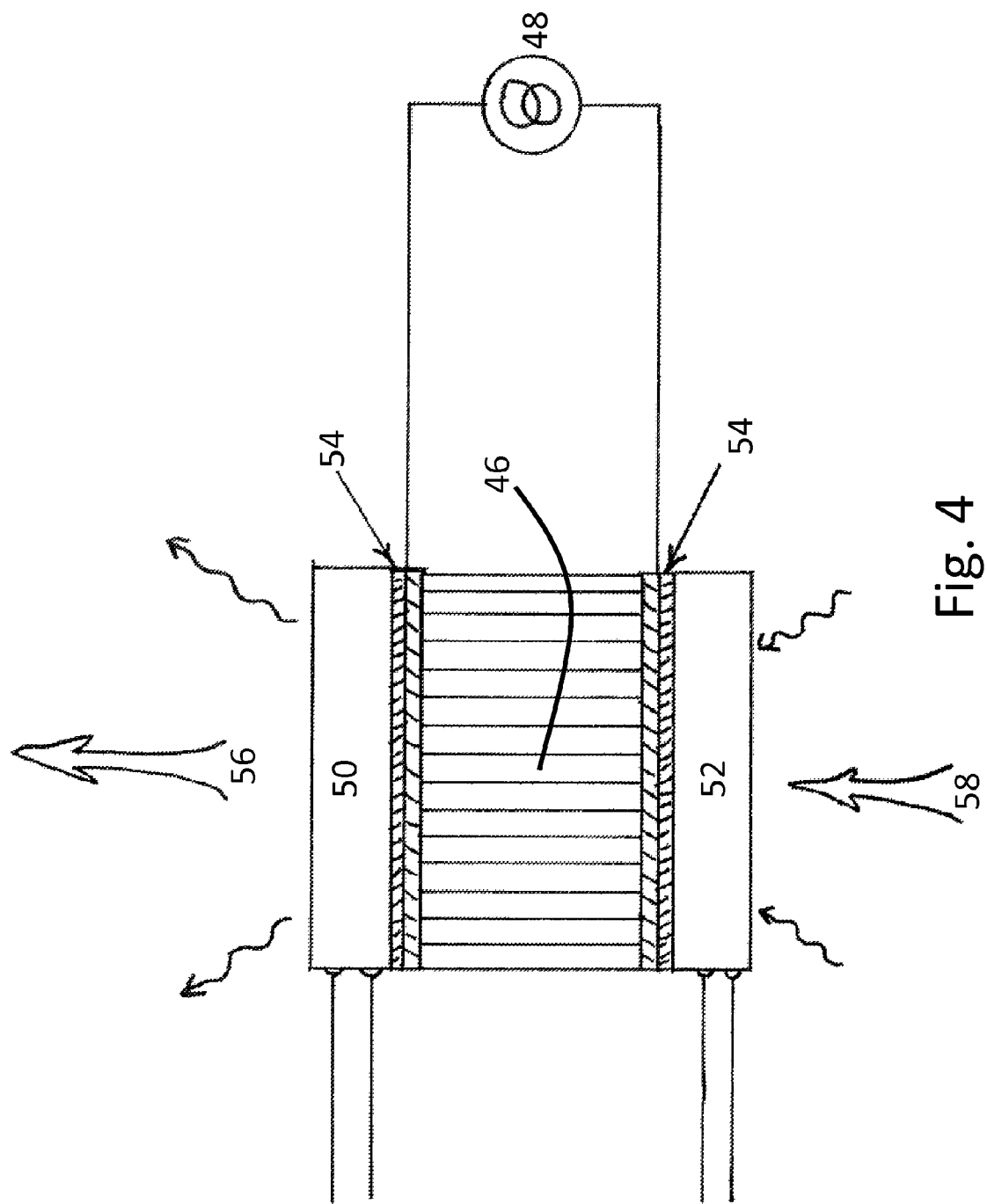
FIG. 4 depicts a method of creating and directing a linear force without the use of any moving parts.

FIG. 4 depicts a novel method of creating and directing a linear force without the use of any moving parts. An active element 46, similar to that depicted in FIG. 1 is connected to an appropriate power supply capable of generating a direct electrical current 48. A thermal gradient is established along the path of this current, by use of heating and cooling elements 50 and 52. These heating and cooling elements may be solid state devices in the form of thermoelectric modules, or they may be classical resistive heating elements and refrigeration units. The heating and cooling elements are offset from the active element 46 by thermally conductive but electrically insulated media, such as thin Al2O3 sheets or thermally conductive epoxy 54. When current is applied to the active element 46 such that charge carriers (fermions) propagate in the direction 56 of the hot face and away from the cold face of the system in the direction 58, a force is seen to evolve, acting on the entirety of the system, in the direction 56 of the hot face.

Figure 5:
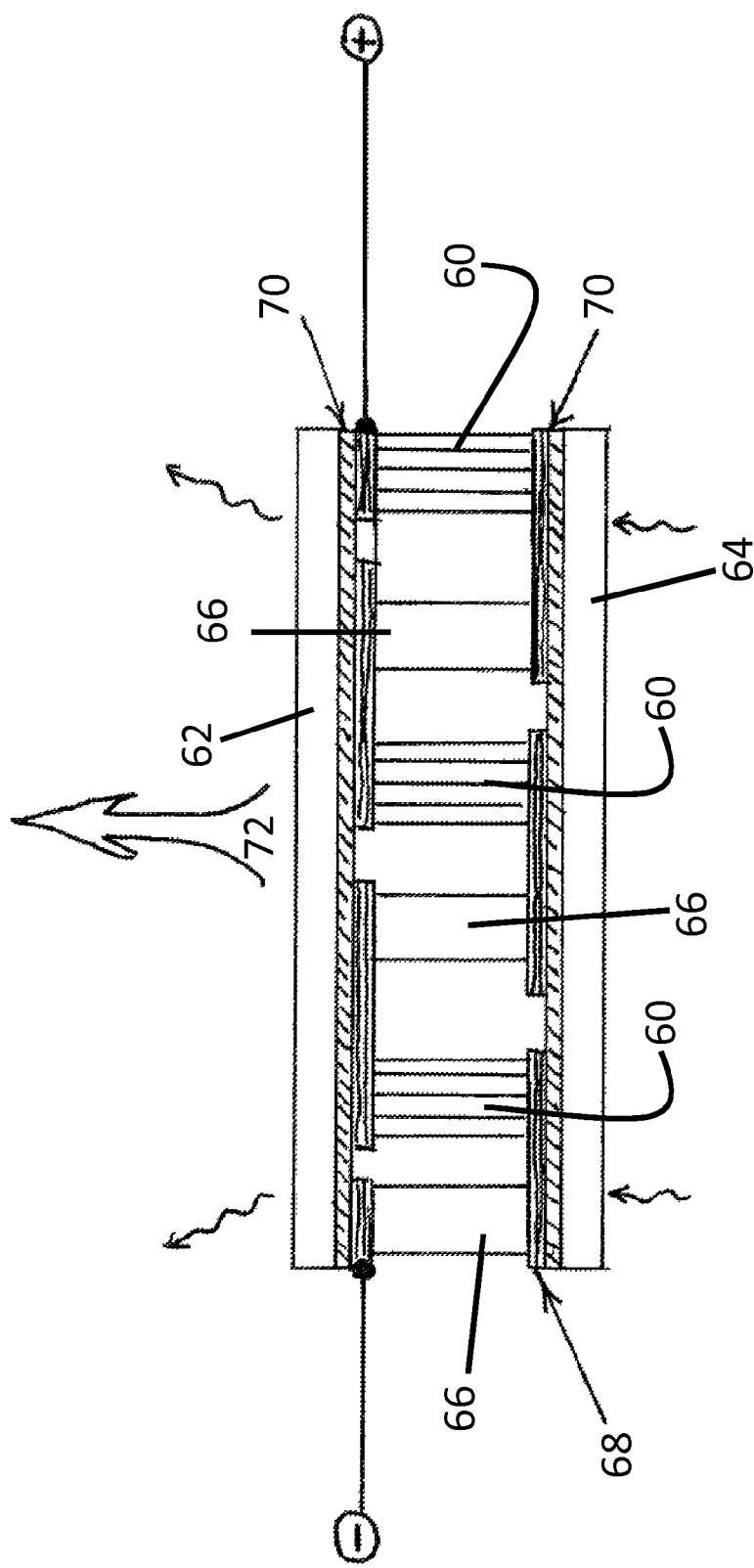
FIG. 5 depicts an alternate embodiment of FIG. 4 in which multiple active elements are arrayed.

FIG. 5 depicts an embodiment in which multiple active elements 60 are arrayed such that an electrical current passes through them in series, with a thermal gradient applied similar to FIG. 4 at 62, 64. However the non-active but electrically conductive elements 66 are positioned in the circuit between active elements, such that the sign or direction of charge carriers through the active elements is conserved. These non-active shunts 66 are composed of a metal or material having poor thermal conductivity, but good electrical conductivity. Stainless steel, titanium, alloys of lead or tin are found to be preferable but not exclusive. The non-active shunts are electrically connected to the active elements by suitable metal foil patterned tabs 68 that may be comprised of copper, silver, aluminum, or brass. These tabs 68 are affixed to a thin thermally conductive but electrically insulating layer 70. A force is seen in direction 72.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A device comprising:
   an electric power source;
   a metalloid selected from the group consisting of Bismuth, Tellurium, Bismuth Telluride, Bismuth Selenide, Bismuth Antimonide, Mercury Telluride, and Bismuth Mercury Telluride, said metalloid being utilized as substantially equidistantly spaced active weight gaining elements located around the rim of an annular shaped rotating assembly that is driven by a motor; and
   an electrical connection for selectively applying electric power from said source to said metalloid such that the mass of said metalloid is temporarily increased.

2. A device according to claim 1 wherein said metalloid is in an intrinsic high purity form.

3. A device according to claim 1 wherein said metalloid is doped to provide either n- or p-electronic properties.

4. A device according to claim 3 wherein the dopant includes at least one of Selenium, Antimony, Arsenic, Tellurium, Lead and Phosphorous.

5. A device according to claim 1 wherein said metalloid is utilized as one or more active weight gaining elements mounted on a long period reciprocating piston or solenoid driven mechanical actuator.

6. A device according to claim 1 wherein said metalloid is utilized to produce a linear force.

7. A device according to claim 1 wherein said metalloid is utilized as multiple active elements which are arrayed such that an electrical current passes through them in series.

8. A device according to claim 1 wherein the electrical connection sequentially applies electrical power to the weight gaining elements in a commutated arrangement such that the sequentially pulsed mass gain and loss drive a rotating element.

* * * * *